US012579028B2

(12) United States Patent
    Tadokoro

(10) Patent No.:    US 12,579,028 B2
(45) Date of Patent:    Mar. 17, 2026

(54) MEMORY SYSTEM AND CONTROL METHOD

(71) Applicant: Kioxia Corporation, Tokyo (JP)

(72) Inventor: Mitsunori Tadokoro, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/459,365

(22) Filed: Aug. 31, 2023

(65) Prior Publication Data

US 2024/0103968 A1      Mar. 28, 2024

(30) Foreign Application Priority Data

Sep. 22, 2022    (JP) ................................. 2022-151503

(51) Int. Cl.
    *G06F 11/10*          (2006.01)
    *G06F 11/14*          (2006.01)

(52) U.S. Cl.
    CPC ...... *G06F 11/1068* (2013.01); *G06F 11/1004* (2013.01); *G06F 11/1415* (2013.01)

(58) Field of Classification Search
    CPC ............. G06F 11/1068; G06F 11/1004; G06F 11/1415; G06F 11/1072
    See application file for complete search history.

(56) References Cited

U.S. PATENT DOCUMENTS

| | | | |
|---|---|---|---|
| 8,190,812 B2 | 5/2012 | Yano | |
| 10,110,255 B2 | 10/2018 | Yang | |
| 2013/0179748 A1* | 7/2013 | Dong | ................... G06F 11/1012 |
| | | | 714/755 |
| 2014/0164870 A1* | 6/2014 | Sun | ...................... G06F 11/1402 |
| | | | 714/764 |
| 2018/0046543 A1* | 2/2018 | Canepa | ............... H03M 13/154 |
| 2018/0129600 A1 | 5/2018 | Ishiyama | |
| 2020/0065190 A1* | 2/2020 | Li | ........................ G06F 11/1076 |
| 2022/0075687 A1* | 3/2022 | Jain | ...................... G06F 11/1068 |

FOREIGN PATENT DOCUMENTS

| | | |
|---|---|---|
| JP | 2009205555 A | 9/2009 |
| JP | 2018073312 A | 5/2018 |

* cited by examiner

*Primary Examiner* — Guerrier Merant
*Assistant Examiner* — Jack Kensington Barnett
(74) *Attorney, Agent, or Firm* — Kim & Stewart LLP

(57) ABSTRACT

According to one embodiment, a memory system includes a storage unit with a plurality of pages of a plurality of nonvolatile memory cells, each page having a lower page unit and a higher page unit. A correction processing unit for correcting errors in the data stored in the storage unit on a page-by-page basis is provided. A controller is further configured to track a storage location of multi-level data in the storage unit, detect pages for which data is stored only in the lower page unit, cause the correction processing unit to generate an error correction code for the detected page units in an encoding frame, and write the error correction code to a next page unit among the plurality of pages in a set writing order after the last lower page unit in the encoding frame.

20 Claims, 6 Drawing Sheets

FIG. 6

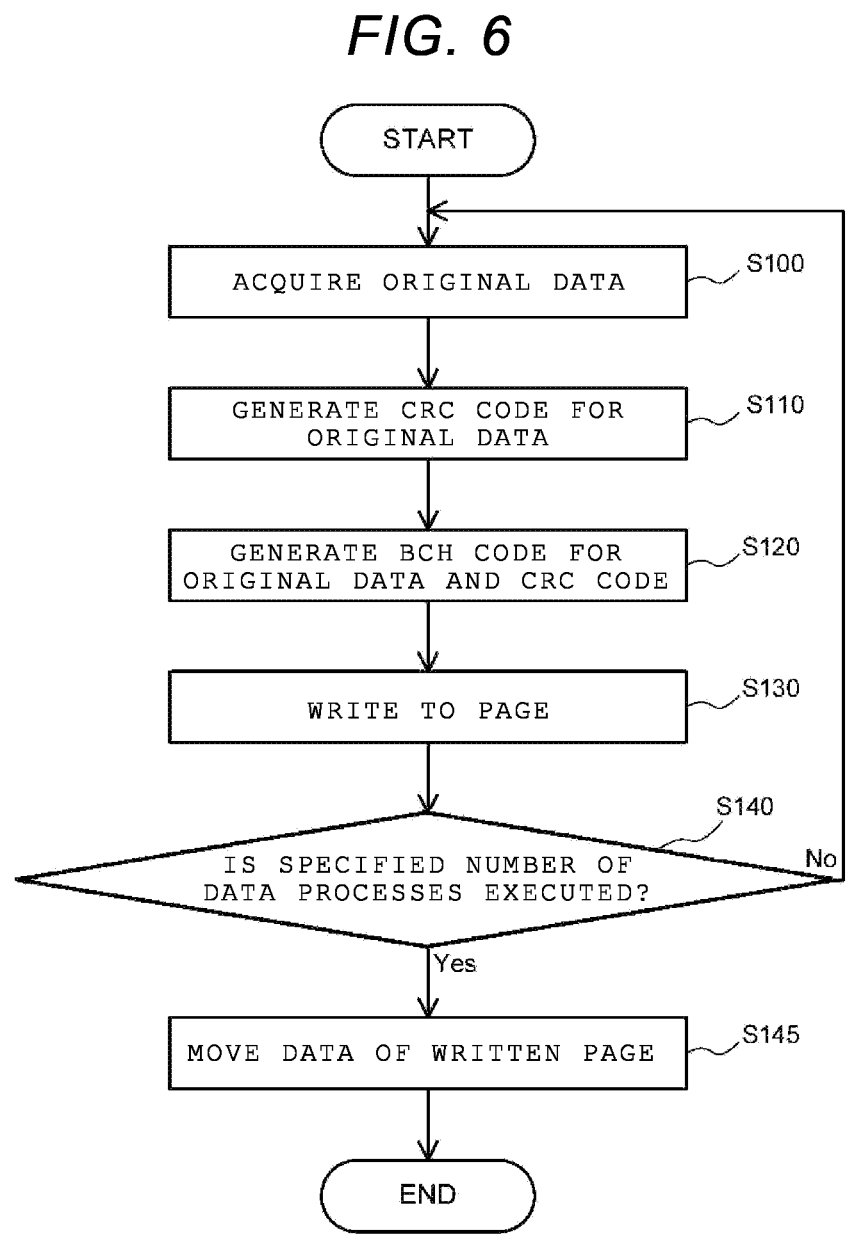

```
              ┌─────────┐
              │  START  │
              └─────────┘
                   │
                   ▼
        ┌──────────────────────┐
        │ ACQUIRE ORIGINAL DATA│────  S100
        └──────────────────────┘
                   │
                   ▼
        ┌──────────────────────┐
        │ GENERATE CRC CODE FOR│────  S110
        │    ORIGINAL DATA     │
        └──────────────────────┘
                   │
                   ▼
        ┌──────────────────────────┐
        │  GENERATE BCH CODE FOR   │────  S120
        │ ORIGINAL DATA AND CRC CODE│
        └──────────────────────────┘
                   │
                   ▼
        ┌──────────────────────┐
        │    WRITE TO PAGE     │────  S130
        └──────────────────────┘
                   │
                   ▼    S140
            ╱─────────────╲
           ╱ IS SPECIFIED  ╲     No
          ╱ NUMBER OF DATA  ╲───────
          ╲ PROCESSES       ╱
           ╲ EXECUTED?     ╱
            ╲─────────────╱
                   │ Yes
                   ▼
        ┌──────────────────────┐
        │ MOVE DATA OF WRITTEN │────  S145
        │        PAGE          │
        └──────────────────────┘
                   │
                   ▼
              ┌─────────┐
              │   END   │
              └─────────┘
```

MEMORY SYSTEM AND CONTROL METHOD

CROSS-REFERENCE TO RELATED APPLICATION(S)

This application is based upon and claims the benefit of priority from Japanese Patent Application No. 2022-151503, filed Sep. 22, 2022, the entire contents of which are incorporated herein by reference.

FIELD

Embodiments described herein relate generally to a memory system and a control method for a memory system.

BACKGROUND

A nonvolatile memory is used for data storage in a memory system such as a solid-state drive (SSD). A NAND flash memory is a known type of nonvolatile memory that can store 2 bits or more of data (multi-level storage) in each memory cell. However, to implement a multi-level storage system, it is necessary to perform a control operation so that each of a plurality of threshold voltage distributions (in the case of four levels, four threshold voltage distributions) falls in a predetermined range corresponding to the multi-level data (four levels for the 2-bit data values "00", "01", "10", and "11"). Therefore, when the number of bits to be stored increases, it generally becomes necessary to control a threshold voltage distribution corresponding to one data value within a narrower and narrower range.

Here, for example, when data is written to a 4-level storage memory cell, after data is written to a lower page, data is written to an upper page, thereby storing 2-bit (4-level) data. In a series of program operations from the lower page to the upper page, for example, when writing is interrupted due to improper shutdown (hereinafter also referred to as momentary shutdown) in the middle of writing data to the upper page, data previously written to the lower page may also be involved and destroyed (lost). Such data loss caused by a momentary shutdown may also occur in the case of other multi-level storage schemes such as 8-level storage and 16-level storage.

BRIEF DESCRIPTION OF THE DRAWINGS

FIG. 6 is a flowchart illustrating an operation of a memory system of a comparative example.

DETAILED DESCRIPTION

Embodiments provide a memory system and a control method capable of maintaining data, such as a previously written lower page, even if a momentary power failure occurs during a program operation such as writing data to an upper page of a multi-level memory.

In general, according to one embodiment, a memory system includes a storage unit with a plurality of pages of a plurality of nonvolatile memory cells capable of storing multi-level data. Each page has at least a lower page unit and a higher page unit. A correction processing unit is provided for correcting errors in the data stored in the storage unit on a page-by-page basis. A controller is configured to write the multi-level data to the storage unit and read the written multi-level data from the storage unit. The controller is further configured to track a storage location of the multi-level data in the storage unit, detect pages among the plurality of pages for which data is stored only in the lower page unit, cause the correction processing unit to generate an error correction code for all of the lower page units of the detected pages in an encoding frame, and write the error correction code to a next page unit among the plurality of pages in a set writing order after the last lower page unit in the encoding frame.

CONFIGURATION OF EMBODIMENT

An example of a memory system according to an embodiment of the present disclosure will be described with reference to the drawings. In an embodiment, error correction is performed on an already written lower block which might be affected by data loss the during writing of an upper block (including immediately before or during writing). Accordingly, it is possible to restore data even when momentary shutdown, such as improper shutdown of power supply, occurs during writing and data written in the lower block is lost.

Figure 1:
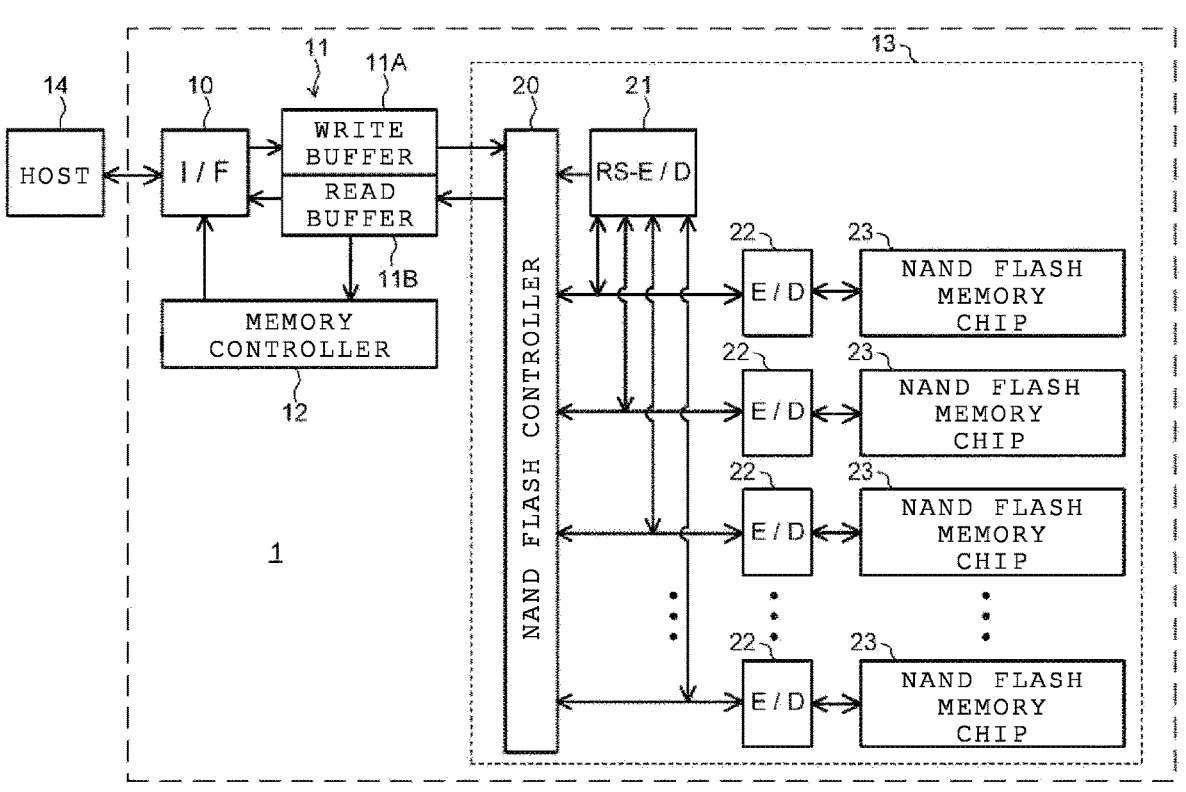
FIG. 1 is a block diagram of a memory system according to an embodiment.

FIG. 1 is a diagram illustrating an example configuration of a memory system 1 applicable to the embodiment of the present disclosure. In the example of FIG. 1, the memory system 1 includes a host interface (I/F) 10, a buffer memory 11, a memory controller 12, and a flash memory unit 13.

The host interface 10 is a communication interface between the memory system 1 and a host 14 connected to the memory system 1. The host 14 is, for example, an information processing device such as a personal computer (PC). As the host interface 10, for example, SCSI, serial attached SCSI (SAS), ATA, serial ATA (SATA), PCI Express® (PCIe®), Ethernet, Fibre Channel, NVM Express® (NVMe®), and the like may be used.

The buffer memory 11 includes a write buffer 11A that temporarily stores write data sent from the host 14 via the host interface 10, and a read buffer 11B that temporarily stores read data read from the flash memory unit 13 before transferring the data to the host 14. The memory controller 12 includes, for example, a central processing unit (CPU), and controls the host interface 10 and the buffer memory 11 to write data to the flash memory unit 13 and read data from the flash memory unit 13.

The memory controller 12 may receive a command requesting a flush process (hereinafter referred to as "flush command") from the host 14. The flush process is a process in which the host 14 requests the memory system 1 to make all data nonvolatile, and the process is executed in response to the flush command from the host 14. Upon receiving the flush command from the host 14, the memory system 1 executes a process of writing any unwritten data stored in the write buffer 11A to a NAND flash memory chip 23 (also referred to as a non-volatilization process). The end location of the unwritten data stored in the write buffer 11A when the flush command is issued becomes target data for the non-volatile process corresponding to the flush command.

The flash memory unit 13 includes a NAND flash controller 20 (controller), a plurality of NAND flash memory chips 23 (storage units), and a plurality of encoders and decoders 22 (E/D units 22). An E/D unit 22 can be respectively provided for each of the NAND flash memory chips 23. The flash memory unit 13 further includes a Reed-Solomon code encoder and decoder 21 (an RS-E/D unit 21). The NAND flash memory chip 23 is configured to write bit data to a large number of memory cells arranged three-dimensionally in the chip, read written data, or erase written data in block units.

The NAND flash controller 20 controls writing, reading, and erasing of the data for each NAND flash memory chip 23. The NAND flash controller 20 also controls the operations of the RS-E/D unit 21 and each of the E/D units 22. The NAND flash controller 20 can detect and manage a data storage location and a page having valid data or invalid data.

For example, when a predetermined amount of data (original data) is stored in the write buffer 11A, the NAND flash controller 20 supplies the E/D unit 22 with the data for storage in the NAND flash memory chip 23 from the write buffer 11A. Write data is error correction coded, and stored in the NAND flash memory chip 23 under control of the NAND flash controller 20. When the memory controller 12 receives the flush command from the host 14, the NAND flash controller 20 executes writing to the NAND flash memory chip 23.

When data is written, the RS-E/D unit 21 (correction processing unit) performs error correction coding using a Reed-Solomon code (RS code) on original data input from the write buffer 11A. When data is read, the RS code attached to data stored in the NAND flash memory chip 23 is decoded, and error correction can be performed on the data. Thus, the RS-E/D unit 21 performs error correction coding (encoding), error correction, and the like. In the embodiment, the Reed-Solomon code is generated to implement error correction, but the embodiment is not limited thereto. As long as the error correction coding can perform erasure correction, other methods such as XOR or the like may be used. The RS code generated by the RS-E/D unit 21 is supplied to the E/D unit 22 in response to the control of the NAND flash controller 20.

When data is written, the E/D unit 22 generates a cyclic redundancy check (CRC) code on the data (original) read from the write buffer 11A, and also performs error correction coding using a systematic code such as a Bose-Chaudhuri-Hocquenghem (BCH) code on the original data and the generated CRC code. When data is read, the E/D unit 22 decodes the BCH code attached to the data stored in the NAND flash memory chip 23 to correct an error, and decodes the CRC code to find an error location. As such, the E/D unit 22 performs error correction coding and error correction.

The E/D unit 22 generates the CRC code for the RS code generated by the RS-E/D unit 21, generates the BCH code for the RS code and the CRC code, and performs error correction coding.

It should be noted that a code to be used for the error correction coding performed by the E/D unit 22 is not limited to the BCH code, and may be another code system. For example, the RS code or a low-density parity-check (LDPC) code may be used. The CRC code is not limited thereto, and other codes such as a checksum may be used as long as the code has sufficient error detection capability.

The NAND flash memory chip 23 includes a memory cell array. The memory cell array has a plurality of memory cells arranged in a matrix configuration. The memory cell array of the NAND flash memory chip 23 includes a plurality of blocks (physical blocks). The block is a unit for erasing data. Each of the plurality of blocks includes a plurality of pages. Each page is a unit for writing and reading data.

Figure 2:
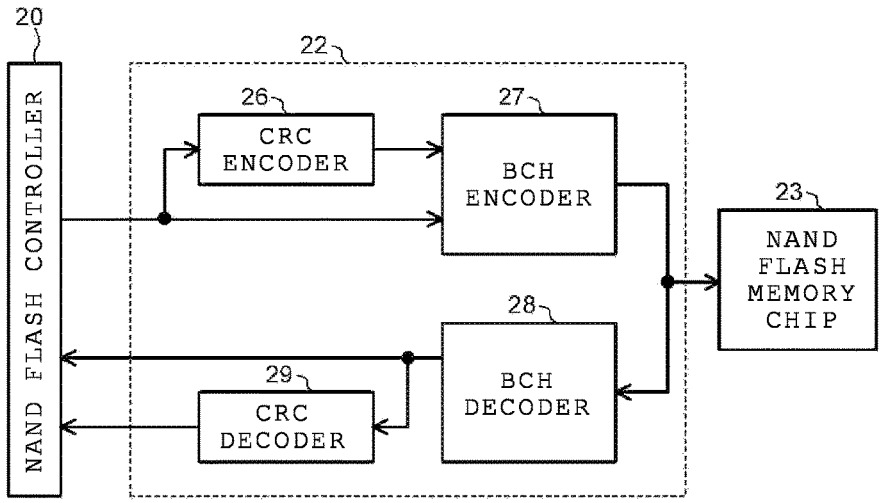
FIG. 2 is a block diagram of an encoder/decoder unit of a memory system according to an embodiment.

FIG. 2 is a diagram illustrating an example of the detailed configuration of one E/D unit 22 in the flash memory unit 13. The E/D unit 22 includes a CRC encoder 26, a BCH encoder 27, a BCH decoder 28, and a CRC decoder 29.

When data is written, the original data input to the E/D unit 22 for encoding is supplied to the CRC encoder 26 and the BCH encoder 27, respectively.

The CRC encoder 26 calculates the CRC of the supplied original data and generates a CRC code (which is an error inspection code) from the calculation result. The CRC code is supplied to the BCH encoder 27. The BCH encoder 27 generates a BCH code (which is an error correction code) on the original data along with the CRC code supplied from the CRC encoder 26, thereby performing error correction coding on the original data and the CRC code. The BCH code, the original data, and the CRC code are output from the E/D unit 22, and then stored as data in a predetermined area of the NAND flash memory chip 23.

When data is read, BCH encoded data is read from the NAND flash memory chip 23, and then input to the BCH decoder 28 of the E/D unit 22. The BCH decoder 28 decodes the BCH code of the input data and corrects any error that can be corrected by code correction capability of the BCH code. The CRC decoder 29 decodes the CRC code provided in the output of the BCH decoder 28 to perform error inspection. The output of the BCH decoder 28 and the error inspection result are output from the E/D unit 22 to the NAND flash controller 20.

The operation of reading data from the NAND flash memory chip 23 is generally performed as follows. Data read from each NAND flash memory chip 23 is supplied to each corresponding E/D unit 22. In the E/D unit 22, the BCH decoder 28 decodes the BCH code for the supplied data and performs error correction for the original data and the CRC code, and the CRC decoder 29 decodes the CRC code provided in the output of the BCH decoder 28 to perform error inspection. The error-corrected data and the error inspection result are supplied to the NAND flash controller 20 and the RS-E/D unit 21, respectively.

The RS-E/D unit 21 decodes the RS code, and performs error correction using the RS code for the original data, the error of which is corrected by the BCH code output from the E/D unit 22, and the RS code itself. Here, whether to perform a normal error correction or an erasure correction can be selected according to the conditions regarding the number of errors and the like. If the erasure correction is selected to be performed, the error-corrected original data is provided to the NAND flash controller 20 as output data.

However, when the normal error correction is selected to be performed, each E/D unit 22 further performs error correction using the BCH code on the original data, the error of which is corrected by the RS-E/D unit 21 using the RS code. When all errors are corrected by the error correction, the error-corrected original data is supplied to the NAND flash controller 20 as output data. When all the errors are not corrected, error correction may be performed again in the RS-E/D unit 21 and each E/D unit 22.

The NAND flash controller 20 completes a series of error corrections and then finally writes the data supplied from each E/D unit 22 and the RS-E/D unit 21 to the read buffer 11B.

Memory Chip Configuration

Next, the configuration of the NAND flash memory chip will be schematically described. The NAND flash memory chip is formed of a plurality of memory blocks BLK. The configuration of a memory block BLK will be described with reference to FIG. 3.

Figure 3:
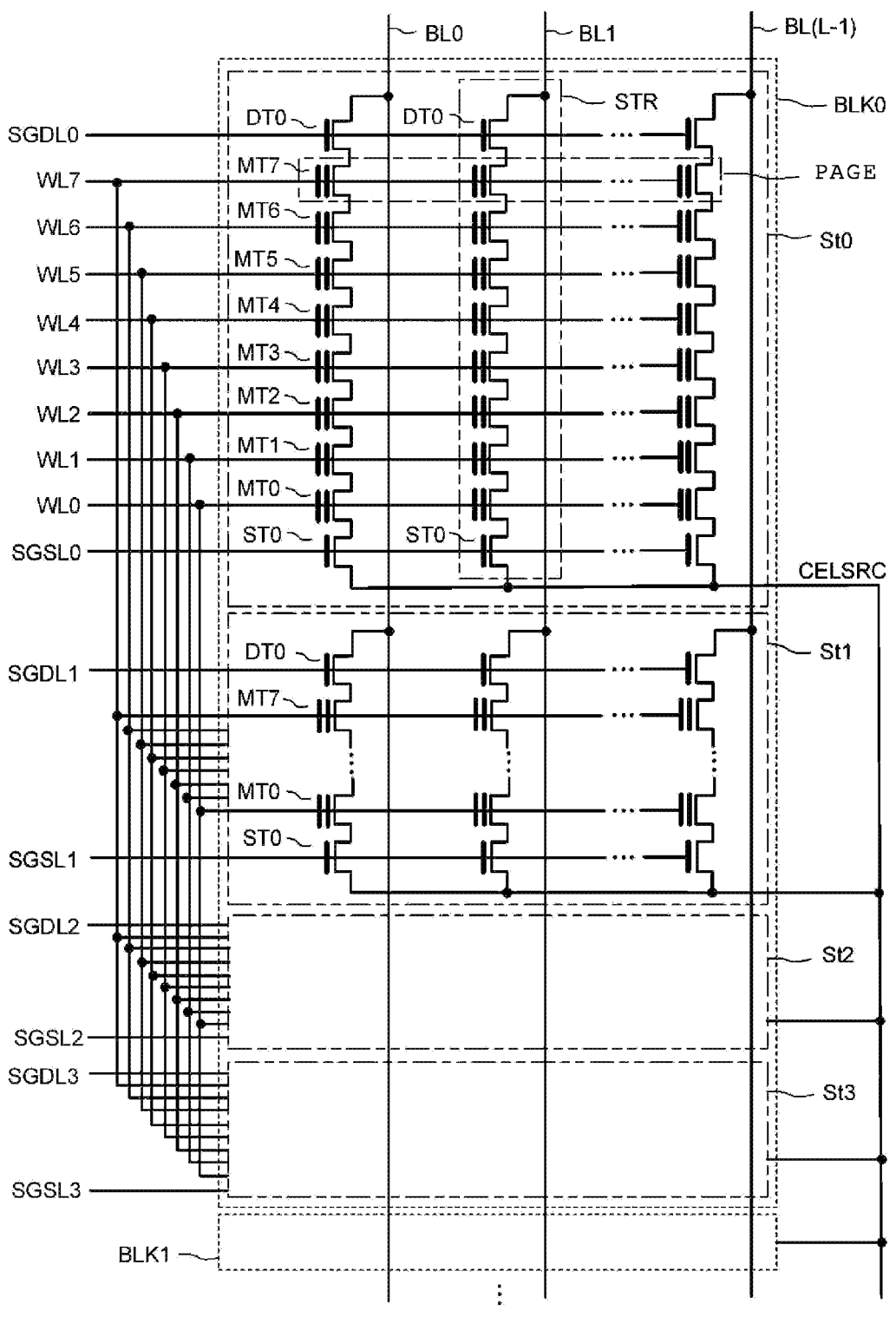
FIG. 3 is an equivalent circuit diagram of a memory block of a NAND flash memory chip of a memory system according to an embodiment.

FIG. 3 is a diagram illustrating a configuration example of the NAND flash memory chip 23 according to the embodiment of the present disclosure. Each block BLK (here, BLKO) may include string units St0 to St3. Since the string units St0 to St3 have the same configuration, the configuration of the string unit St0 will be described here as representative.

The string unit St0 is connected to a plurality of word lines WL0 to WL7 and a plurality of bit lines BL0 to BL(L−1). The string unit St0 includes a plurality of NAND strings STR. Each NAND string STR includes one select gate transistor ST0, a plurality (for example, eight) of memory cell transistors MT0 to MT7, and one select gate transistor DT0. The select gate transistor ST0, the memory cell transistors MT0 to MT7, and the select gate transistor DT0 are connected in series between a source line CELSRC and one bit line BL in this order.

Each memory cell transistor MT functions as a memory cell. Each memory cell transistor MT includes a control gate and a charge storage layer. The control gates of the memory cell transistors MT0 to MT7 are connected to the word lines WL0 to MT7 are connected to the word lines WL0 to WL7, respectively. The gate of the select gate transistor ST0 is connected to a select gate line SGSL0. The gate of the select gate transistor DT0 is connected to a select gate line SGDL0. For example, in the string unit St0, a set (group) including a memory cell transistor MT (for example, MT7) connected to the same word line WL (for example, WL7) is referred to as a page. When the NAND flash memory chip 23 is a TLC-NAND flash NAND (TLC), a set including a memory cell transistor MT connected to the same word line WL functions as three pages (a lower page, a middle page, and an upper page).

A plurality of word lines WL are connected in common to the string units St0 to St3. Therefore, for each word line WL, a set including a memory cell transistors MT connected to the word line WL is divided into four groups (that is, a group of memory cell transistors MT belonging to the string unit St0, a group of memory cell transistors MT belonging to the string unit St1, a group of memory cell transistors MT belonging to the string unit St2, and a group of memory cell transistors MT belonging to the string unit St3). One group is used as one write unit.

A control circuit, provided in the NAND flash memory chip and including a sense amplifier and a potential generation circuit, is configured to write the data supplied to the NAND flash memory chip to a memory cell transistor MT, and to output the data stored in the memory cell transistor MT to the outside of the NAND flash memory chip.

In the NAND flash memory chip, one memory block BLK includes a plurality of pages. A plane includes a plurality of memory blocks BLK. Different planes in a NAND flash memory chip are accessible in parallel. On the other hand, different blocks in the same plane are not accessible in parallel.

Figure 4:
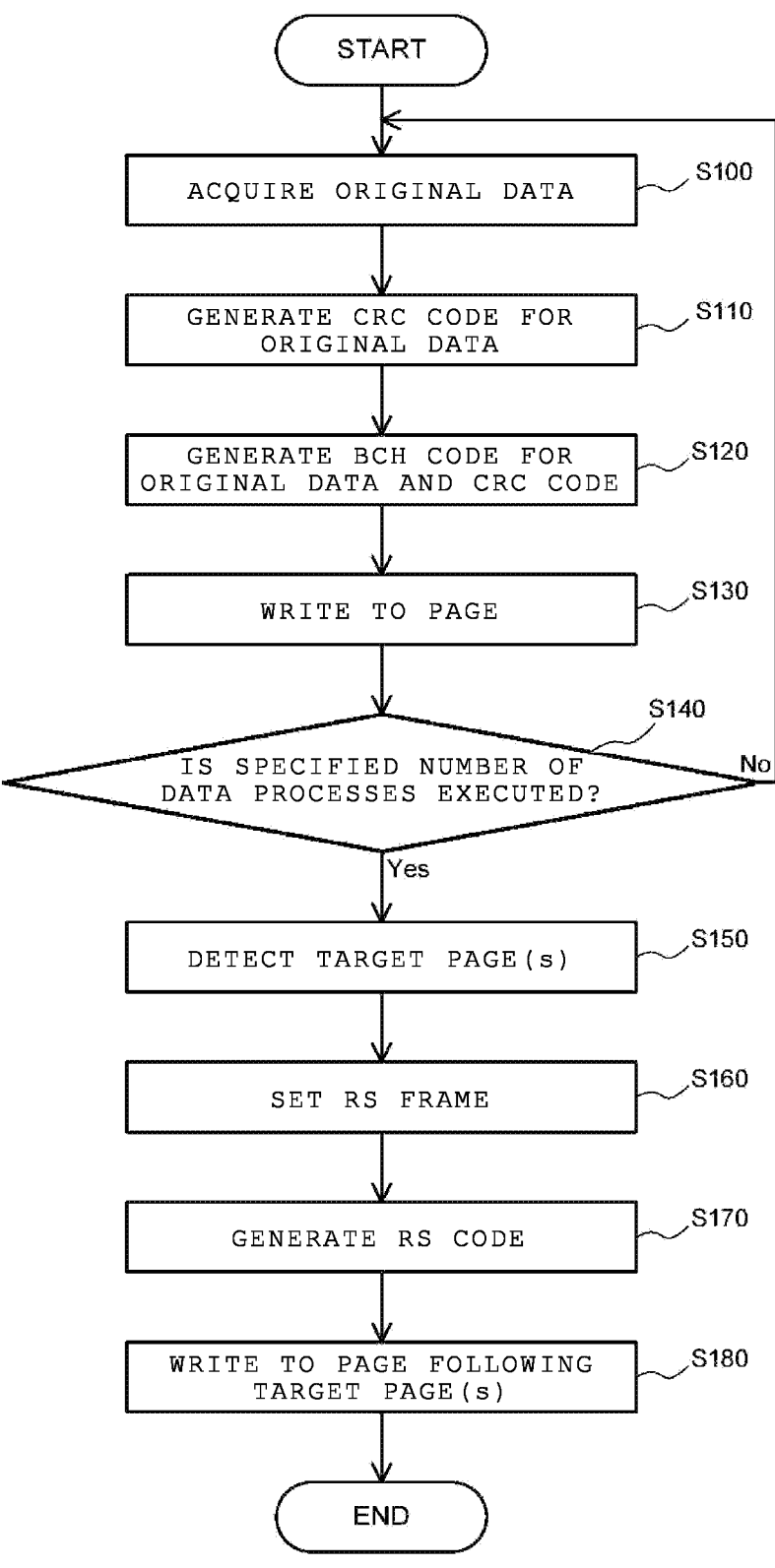
FIG. 4 is a flowchart illustrating an operation of a memory system according to an embodiment.
Figure 5A:
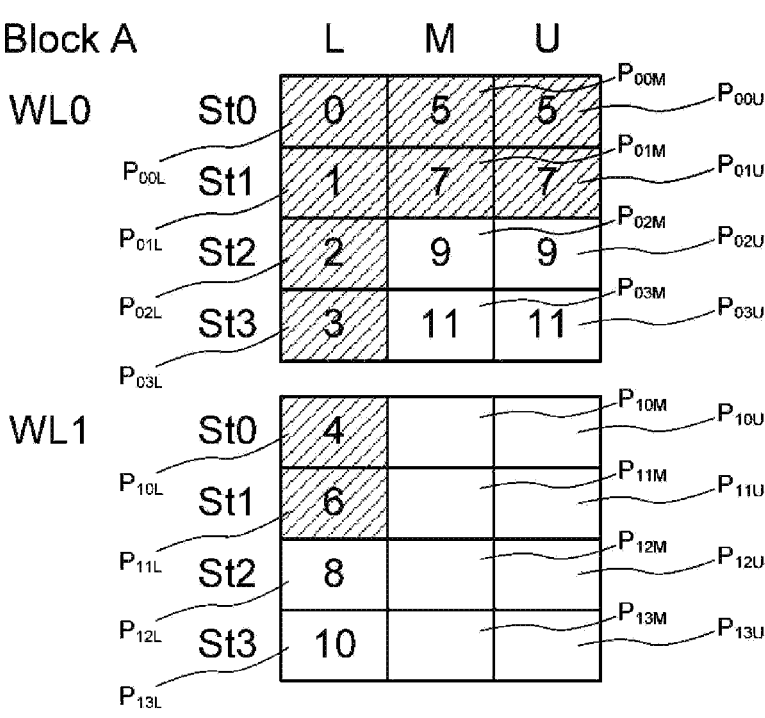
FIGS. 5A and 5B are diagrams illustrating aspects of a page-by-page write operation in a memory system according to an embodiment.
Figure 5B:
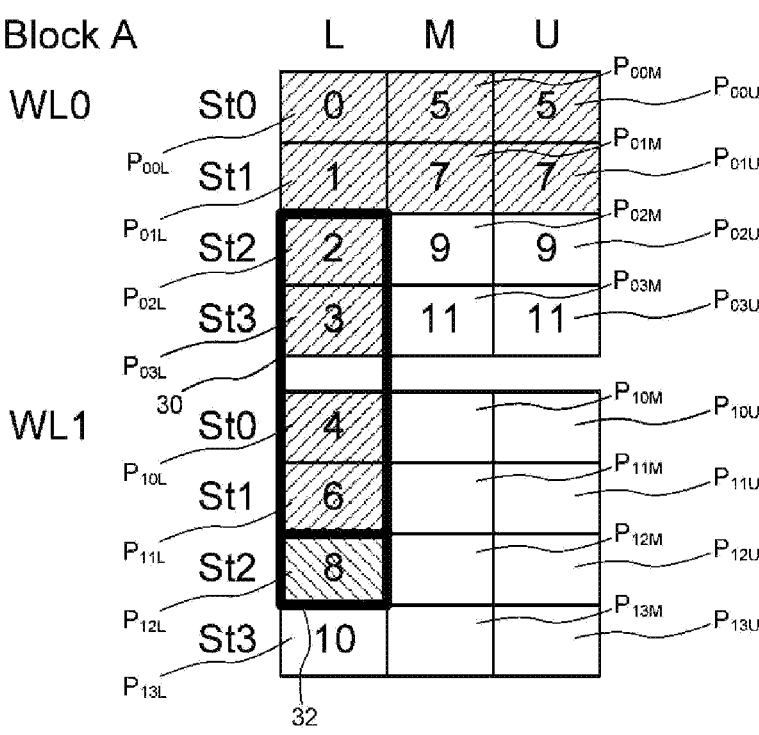

Error correction coding at the time of writing data according to the embodiment will be described with reference to FIGS. 4, 5A, and 5B. FIG. 4 is an example of a flowchart of error correction coding. FIGS. 5A and 5B illustrate a state in which the memory controller 12 receives a flush command, and the NAND flash controller 20 writes data to a plurality of pages of the memory block BLK provided in the NAND flash memory chip 23.

FIGS. 5A and 5B illustrate a state of pages of the word lines WL0 and WL1 in a certain memory block A. In the drawings, St0 to St3 designate strings of the respective word lines, and "L", "M", and "U" designate a lower page, a middle page, and an upper page, respectively, for each string. In the case of a multi-level memory, a series of data is written to each of the lower page, the middle page, and the upper page. The host 14 may at some point request the memory system 1 to perform a flush process to cope with the momentary shutdown or the like.

For example, a flush request may be received from the host after the memory system 1 has completed writing data to a lower page in a string but before the memory system 1 completes writing data for the middle page and the upper page. In response to the flush request, invalid data can be written to the initially unwritten middle page and upper page of the memory chip 23, but this additional writing (of invalid/dummy data) causes deterioration in writing efficiency. When the amount of writing of invalid data for data stabilization purposes becomes large, the response time until completion of a flush process becomes longer, and as such, the performance of the entire system including the host 14 deteriorates. In the embodiment, a write control is performed when the flush process is performed for coping with a momentary shutdown. FIG. 5A illustrates a state before the flush process is executed, and FIG. 5B illustrates a state after the flush process is executed.

The word line WL0 provides to a lower page group ("L" column), a middle page group ("M" column), and an upper page group ("U" column). The lower page group of the word line WL0 includes four pages POOL to $P_{031}$, respectively corresponding to four strings St0 to St3. In the same manner, the middle page group includes pages $P_{00M}$ to $P_{03M}$ respectively corresponding to the strings St0 to St3, and the upper page group includes pages Poo u to Po $3u$ respectively corresponding to the strings St0 to St3. In the same manner, the lower page group, the middle page group, and the upper page group of the word line WL1 include pages $P_{10L}$, to $P_{13L}$, pages $P_{10M}$ to $P_{13M}$, and pages $P_{10U}$ to $P_{13U}$ respectively corresponding to the strings St0 to St3.

In FIGS. 5A and 5B, one frame (square) represents a page unit (one page of one string), and the number written inside the frame indicates the writing order of the pages. A frame with hatching of diagonal lines directed downwards to the left indicates a page in which writing has been completed and in which valid data exists. A blank frame is an unwritten page.

The E/D unit 22 acquires a predetermined amount (for example, 512 bytes) of data (original data) stored in the write buffer 11A via the NAND flash controller 20 (S100). Here, the RS-E/D unit 21 also acquires the original data.

In the E/D unit 22, the CRC encoder 26 calculates a CRC for every 8 bits of the original data and generates a CRC code (S110). In the example, a CRC code having 4 bytes is generated from the original data having 512 bytes. The CRC code is supplied to the BCH encoder 27.

Next, the BCH encoder 27 generates a BCH code for every 8 bits of the original data and also generates a BCH code for every 8 bits of the CRC code generated in step S110 (S120). In the example, a BCH code having 26 bytes is generated from the original data having 512 bytes and the CRC code having 4 bytes.

The NAND flash controller 20 stores the original data, the CRC code generated from the original data, and the BCH code generated from the original data and the CRC code in one page of a plane of the NAND flash memory chip 23 (S130).

The NAND flash controller 20 determines whether a specified number of data processes (repeats of steps S100 to S130) have been performed (S140). When it is determined that the specified number of data processes has not been performed yet (No in S140), the process returns to step S100, and the next predetermined amount of original data is acquired. By the process of steps S100 to S140, writing is performed in an order of pages $P_{00L}$, $P_{01L}$, and so forth. The NAND flash controller 20 may determine that the predetermined number of data processes is performed when the host 14 issues a flush programming instruction.

Here, as shown in FIG. 5A, pages $P_{02L}$, $P_{03L}$, $P_{10L}$, and $P_{11L}$ have only the lower page written before flush execution are thus in a state in which a second stage program has not been completed. Note, in some examples, the lowest page not written among a plurality of pages may be considered similarly as the first or lower page in this example.

When unexpected shutdown or the like occurs during writing to a middle page or upper page (for example, page $P_{02M}$ or $P_{03M}$), the pages $P_{02L}$, $P_{03L}$, $P_{10L}$, and $P_{11L}$ may be affected by the unexpected shutdown and data thereof may be destroyed (lost). Therefore, in the memory system of the embodiment, the process in step S150 is executed (or steps before S150 then up to and including S150 are performed).

In step S140, if it is determined that the specified number of data processes has been performed (or the flush command is received), the NAND flash controller 20 detects (identifies) a page for which the second stage program is not completed (S150). In the context, the second stage program not being completed means that upper page units of a page have not yet been written with data of some type. In the example illustrated in FIG. 5B, since there is no written data in pages located higher than the lowest written pages $P_{02L}$, $P_{03L}$, $P_{10L}$, and $P_{11L}$, these pages are detected.

The NAND flash controller 20 sets the detected pages $P_{02L}$, $P_{03L}$, $P_{10L}$, and $P_{11L}$ in an RS frame (S160). In FIG. 5B, the RS frame is surrounded by a thick line black frame.

The RS-E/D unit 21 generates an RS code for data of the set in the RS frame (S170). The RS-E/D unit 21 traverses a data block from the obtained data, extracts data by 8 bits (one symbol) corresponding to the location in the data block, and generates the RS code.

The NAND flash controller 20 writes the generated RS code to the next writable page (page P 12L in FIG. 5A) of the NAND flash memory chip 23 (S180). That is, the RS code or the like is written to the page $P_{12L}$ as an RS parity of the pages $P_{02L}$, $P_{03L}$, $P_{10L}$, and $P_{11L}$ as in FIG. 5B. A frame indicated by diagonal lines directed downwards to the right indicates a page in which writing has been completed and in which the RS parity exists.

As described above, the memory system of the embodiment is configured to, in the flush process, read data of a page in which only the lower page unit is written (a page unit of data that is likely to be lost due to unexpected shutdown) to form an RS frame made up of a group of these type pages, and to generate an RS parity. The generated RS parity is added to the next writable page available in the set writing order. Accordingly, when unexpected shutdown occurs at the time of writing data to higher pages (for example, pages $P_{02M}$, $P_{03M}$, $P_{10M}$, and $P_{11M}$) then data already written in corresponding lower pages (pages $P_{02L}$, $P_{03L}$, $P_{10L}$, and $P_{11L}$) might be lost, the NAND flash controller 20 can perform error correction when reading data of pages $P_{02L}$, $P_{03L}$, $P_{10L}$, and $P_{11L}$, if necessary using the page $P_{12L}$ data in which the RS parity was written.

Figure 7A:
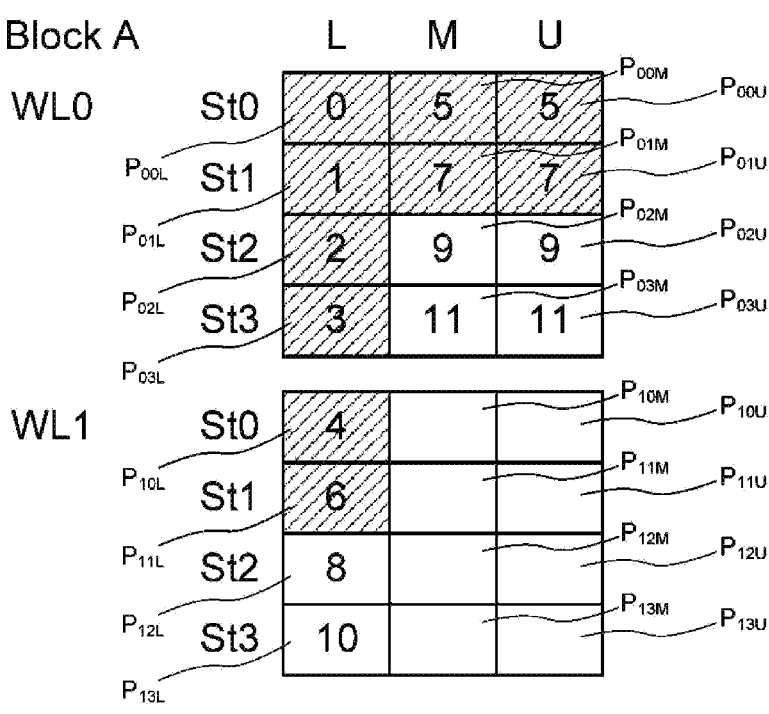
FIGS. 7A and 7B are diagrams illustrating aspects of a page-by-page write operation in a memory system of the comparative example.
Figure 7B:
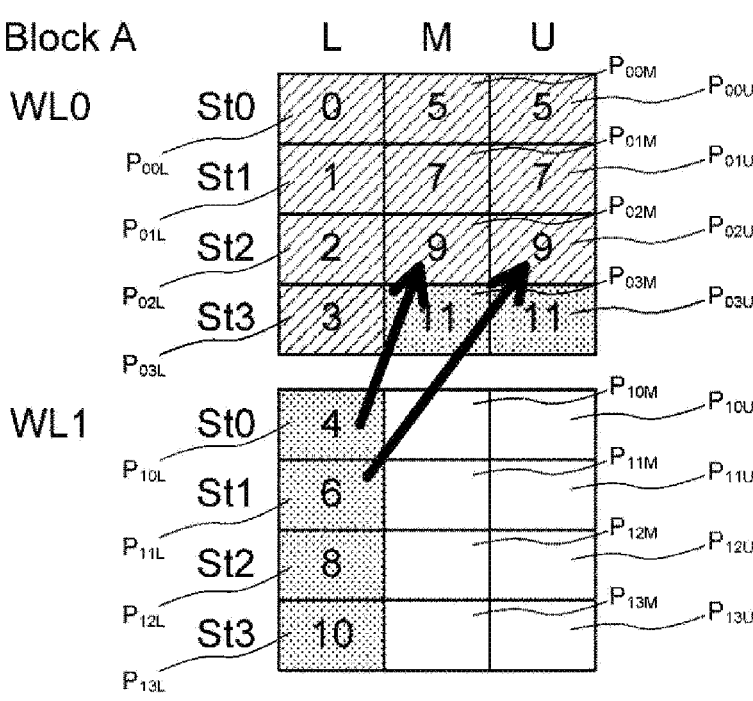

Error correction coding at the time of writing data according to a comparative example will be described with reference to FIGS. 6, 7A, and 7B. FIG. 6 is an example of a flowchart of error correction encoding according to the comparative example. FIGS. 7A and 7B illustrate the comparative example when/after the memory controller 12 receives a flush command and the NAND flash controller 20 writes data to a plurality of pages of the memory block BLK including the NAND flash memory chip 23.

FIGS. 7A and 7B also illustrate a state of pages of the word lines WL0 and WL1 in a certain memory block A. In the drawings, St0 to St3 represent strings of word lines, respectively. In this context, designations "L", "M", and "U" represent a lower page unit, a middle page unit, and an upper page unit, respectively. In the comparative example, in the case of a multi-level memory, data is written to a page in a sequence of the lower page unit of the page, the middle page unit of the page, and then the upper page unit of the page. At some point, the host 14 may request the memory system 1 to perform a flush process to cope with a momentary shutdown. In the comparative example, write control is performed when the flush process is performed to cope with a momentary shutdown. FIG. 7A illustrates a state before the flush process is executed, and FIG. 7B illustrates a state after the flush process is executed.

The word line WL0 provides a lower page group ("L" column), a middle page group ("M" column), and an upper page group ("U" column). The lower page group of the word line WL0 includes four pages $P_{00L}$ to $P_{03L}$ respectively corresponding to four strings St0 to St3. In the same manner, the middle page group M of the word line WL0 includes pages $P_{00M}$ to $P_{03M}$ respectively corresponding to the strings St0 to St3, and the upper page group U thereof includes pages $P_{00U}$ to $P_{03U}$ respectively corresponding to the strings St0 to St3. In the same manner, the lower page group L, the middle page group M, and the upper page group U of the word line WL1 include pages $P_{10L}$ to $P_{13L}$, pages $P_{10M}$ to $P_{13M}$, and pages $P_{10U}$ to $P_{13U}$ respectively corresponding to the strings St0 to St3.

In FIGS. 7A and 7B, each frame (square) represents a page unit, and the number written inside the frame indicates the writing order of the pages. A frame indicated by diagonal lines directed downwards to the left indicates a page in which writing has been completed and in which valid data exists. A blank frame is an unwritten page. Dot-patterned frames, that is, pages $P_{12L}$, $P_{13L}$, $P_{03M}$, and $P_{03U}$ are pages in which data has been completely written but in which valid data does not exist.

The E/D unit 22 acquires a predetermined amount (for example, 512 bytes) of data (original data) stored in the write buffer 11A via the NAND flash controller 20 (S100). Here, the RS-E/D unit 21 also acquires the original data.

In the E/D unit 22, the CRC encoder 26 calculates a CRC for every 8 bits of the original data and generates a CRC code (S110). In the example, a CRC code having 4 bytes is generated from the original data having 512 bytes. The CRC code is supplied to the BCH encoder 27.

Next, the BCH encoder 27 generates a BCH code for every 8 bits of the original data and also generates a BCH code for every 8 bits of the CRC code generated in step S110 (S120). In the example, a BCH code having 26 bytes is generated from the original data having 512 bytes and the CRC code having 4 bytes.

The NAND flash controller 20 stores the original data, the CRC code generated from the original data, and the BCH code generated from the original data and the CRC code in page 1 of the plane of the NAND flash memory chip 23 (S130).

The NAND flash controller 20 determines whether a specified number of data processes has been performed (S140). When it is determined that the specified number of data processes is not performed yet (No in S140), the process returns to step S100, and the next predetermined amount of original data is acquired.

Here, the pages $P_{02L}$, $P_{03L}$, $P_{10L}$, and $P_{11L}$, are the only the lower pages written before the flush execution and a second stage program is not completed. Therefore, when unexpected shutdown or the like occurs at the time of writing data to a middle page or an upper page, the pages $P_{02L}$, $P_{03L}$, $P_{10L}$, and $P_{11L}$, may be affected by the unexpected shutdown and the data thereof may be destroyed. Therefore, in the memory system of the comparative example, the process in step S145 is further executed.

In step S140, when it is determined that the specified number of data processes has been performed (or the flush command is received), the NAND flash controller 20 writes some of the valid data of the pages $P_{02L}$, $P_{03L}$, $P_{10L}$, and $P_{11L}$ for which the second stage program is not yet completed to a middle page or upper page. The NAND flash controller 20 writes invalid data (dummy data) to the middle page or the upper page as necessary, thereby eliminating the state in which valid data exists on the lower page(s) without a higher page written (S145).

Specifically, the NAND flash controller 20 detects a page for which the second stage program is not completed. In the example illustrated in FIG. 7A, since there is no written data in pages located higher than the lowest written pages $P_{02L}$, $P_{03L}$, $P_{10L}$, and $P_{11L}$, these pages are detected (identified). Among these detected pages $P_{02L}$, $P_{03L}$, $P_{10L}$, and $P_{11L}$, the data of the pages $P_{10L}$, and $P_{11L}$ are written (copied) to the pages $P_{02M}$ and $P_{02U}$, and the data of the original pages $P_{10L}$ and $P_{11L}$ is invalidated (FIG. 7B). The data of the pages $P_{10L}$ and $P_{11L}$ are thus moved (copied) to the pages $P_{02M}$ and $P_{02U}$. Dummy data is written to the pages $P_{03M}$ and $P_{03U}$, which are the pages located higher than the page $P_{03L}$. In this example, dummy data is also written to the pages $P_{12L}$ and $P_{13L}$ which are respectively in the writing order before the pages $P_{02M}$ and $P_{02U}$ and pages $P_{03M}$ and $P_{03U}$. The dot-patterned shading of in FIG. 7B for the frames for pages $P_{03M}$, $P_{03U}$, $P_{12L}$, and $P_{13L}$ indicates pages in which data has been completely written but in which valid data does not exist (only invalid data is present).

Through such process, all valid data in those pages for which only the lower pages were written is moved so all valid data will be in pages for which writing has been fully completed up to the upper pages. As a result, even if power shutdown occurs at the time of writing data to a middle page or an upper page, valid data will not be in a lower page for which the upper pages remain unwritten. The lower pages in such a state with unwritten upper pages and are more likely to be destroyed (degraded) at power shutdown than in a state with written upper pages.

In the memory system illustrated in FIGS. 5A and 5B, a group of pages belonging to different strings in a block (that cannot be programmed at the same time) forms an RS frame, and an RS parity thereof is added to a page following the group of pages, for example, the next lower page in the writing order. With such configuration, it is possible to generate a state in which a plurality of lower pages in the RS frame will not be simultaneously involved and destroyed, thereby making it possible to store data with the addition of a minimum number of pages even if the data written and programmed before a flush command could be affected by an unexpected shutdown and destroyed.

In the memory system of the comparative example, in FIGS. 7A and 7B, every time a flush command is executed, a page which is likely to be affected by power shutdown or the like may be moved (written to a new location and invalidated at the present location), and furthermore, writing of a number of dummy pages may be required.

Comparing the present embodiment and the comparative example, in the operation of the embodiment as illustrated in FIG. 5B, after the flush command is executed, it is required to read the pages $P_{02L}$, $P_{03L}$, $P_{10L}$, and $P_{11L}$, write the RS code for the read pages to the page $P_{12L}$, and execute a first stage program. On the other hand, in the comparative example of the operation illustrated in FIG. 7B, it is required to read the pages $P_{10L}$ and $P_{11L}$, write to the pages $P_{02M}$ and $P_{02U}$, write to the pages $P_{03M}$ and $P_{03U}$, and execute the first stage program and the second stage program. Therefore, the memory system of the embodiment can implement restoration of data lost by momentary shutdown or the like in a shorter response time with the fewer page reading/writings or programs.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:

a storage unit including a plurality of string units each including a plurality of pages of a plurality of nonvolatile memory cells capable of storing multi-level data, each page having a lower page unit and a higher page unit;

a correction processing unit for correcting an error in the data stored in the storage unit on a page-by-page basis; and a controller configured to write the multi-level data to the storage unit and read the written multi-level data from the storage unit, wherein the controller is further configured to:

track a storage location of the multi-level data in the storage unit, detect pages among the plurality of pages across the plurality of string units for which data is stored only in the lower page unit, cause the correction processing unit to generate an error correction code for all of the lower page units of the detected pages in an encoding frame, write the error correction code to a next page unit in a set writing order of page units, the set writing order extending across the plurality of pages and the plurality of string units after the last lower page unit included in the encoding frame, a page corresponding to the next page unit being positioned after the detected pages, and restore data of a page unit included in the encoding frame using the error correction code read from the next page unit in the set writing order of page units after the data of the page unit in the encoding frame is lost.

2. The memory system according to claim 1, wherein the correction processing unit generates a redundant code.

3. The memory system according to claim 2, wherein the redundant code is a Reed-Solomon code.

4. The memory system according to claim 1, wherein each page has three page units.

5. The memory system according to claim 1, wherein the controller is configured to:

receive a flush command; and in response to the flush command, detect the pages among the plurality of pages for which data is stored only in the lower page unit, then cause the data of the lower page units in the detected pages to be read and supplied to the correction processing unit.

6. The memory system according to claim 5, wherein the data of the lower page units in the detected pages is error correction encoded, and the reading of the data of the lower page units in the detected pages includes decoding of the error correction encoded data.

7. The memory system according to claim 1, wherein the storage unit comprises a plurality of memory chips, and the plurality of nonvolatile memory cells are in the plurality of memory chips.

8. The memory system according to claim 7, further comprising:

a plurality of error correction coding units, wherein each memory chip in the plurality of memory chips has one error correction coding unit of the plurality of error correction coding units.

9. The memory system according to claim 8, wherein the error correction coding unit encodes the data stored in the respective memory chip using a different coding scheme than used by the correction processing unit.

10. The memory system according to claim 8, wherein the error correction coding unit encodes data using a Bose-Chaudhuri-Hocquenghem (BCH) code, and the correction processing unit encodes data using a Reed-Solomon code.

11. The memory system according to claim 1, wherein the next page unit is a lower page unit next to the last lower page unit.

12. A method of controlling a memory system including a nonvolatile storage unit, the method comprising:

tracking a storage location of multi-level data in a storage unit including a plurality of string units each including a plurality of pages of a plurality of nonvolatile memory cells;

detecting pages among the plurality of pages across the plurality of string units for which data is stored only in a lower page unit of the page, each page having a lower page unit and a higher page unit;

causing a correction processing unit to generate an error correction code for all of the lower page units of the detected pages in an encoding frame;

writing the error correction code to a next page unit in a set writing order of page units, the set writing order extending across the plurality of pages and the plurality of string units after the last lower page unit included in the encoding frame, a page corresponding to the next page unit being positioned after the detected pages; and restoring data of a page unit included in the encoding frame using the error correction code read from the next page unit in the set writing order of page units after the data of the page unit in the encoding frame is lost.

13. The method according to claim 12, wherein the correction processing unit generates a redundant code.

14. The method according to claim 13, wherein the redundant code is a Reed-Solomon code.

15. The method according to claim 13, further comprising:

detecting the pages among the plurality of pages for which data is stored only in the lower page unit in response to a flush command from a host device, then causing the data of the lower page units in the detected pages to be read and supplied to the correction processing unit.

16. The method according to claim 15, wherein the data of the lower page units in the detected pages is error correction encoded, and the reading of the data of the lower page units in the detected pages includes decoding of the error correction encoded data.

17. The method according to claim 16, wherein the data stored in the lower page units in the detected pages is encoded using a Bose-Chaudhuri-Hocquenghem (BCH) code.

18. The method according to claim 17, wherein the correction processing unit encodes data using a Reed-Solomon code.

19. The method according to claim 12, wherein the plurality of nonvolatile memory cells are NAND flash memory cells.

20. The method according to claim 12, wherein the next page unit is a lower page unit next to the last lower page unit.

* * * * *